United States Patent
Feng et al.

(10) Patent No.: US 11,216,618 B2
(45) Date of Patent: Jan. 4, 2022

(54) QUERY PROCESSING METHOD, APPARATUS, SERVER AND STORAGE MEDIUM

(71) Applicant: BEIJING BAIDU NETCOM SCIENCE AND TECHNOLOGY CO., LTD., Beijing (CN)

(72) Inventors: Xinwei Feng, Beijing (CN); Xunchao Song, Beijing (CN); Miao Yu, Beijing (CN); Huanyu Zhou, Beijing (CN); Shaoshun Kang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 219 days.

(21) Appl. No.: 16/538,589

(22) Filed: Aug. 12, 2019

(65) Prior Publication Data
US 2020/0050671 A1 Feb. 13, 2020

(30) Foreign Application Priority Data
Aug. 13, 2018 (CN) .......................... 201810915123.6

(51) Int. Cl.
*G06F 17/00* (2019.01)
*G06F 40/30* (2020.01)
(Continued)

(52) U.S. Cl.
CPC .......... *G06F 40/30* (2020.01); *G06F 16/3347* (2019.01); *G06F 40/295* (2020.01)

(58) Field of Classification Search
None
See application file for complete search history.

(56) References Cited

U.S. PATENT DOCUMENTS

| 9,015,160 | B2 * | 4/2015 | Jakubik | ................ | G06F 16/355 707/737 |
| 9,026,535 | B2 * | 5/2015 | Jakubik | .................. | G06F 16/35 707/737 |

(Continued)

FOREIGN PATENT DOCUMENTS

| CN | 103034726 A | 4/2013 |
| CN | 103106287 A | 5/2013 |

(Continued)

OTHER PUBLICATIONS

Guan, S-P, et al. "Knowledge Reasoning Over Knowledge Graph A Survey" Journal of Software, vol. 29, No. 10, Oct. 2018, pp. 2966-2994.

(Continued)

*Primary Examiner* — Satwant K Singh
(74) *Attorney, Agent, or Firm* — Lathrop GPM LLP

(57) ABSTRACT

Embodiments of the present disclosure provide a query processing method and an apparatus, a server and a storage medium. The method includes: determining a word vector representation of a query sequence and an entity vector representation of the query sequence respectively based on respective words and respective entities included in the query sequence; determining a word vector representation of a paragraph and an entity vector representation of the paragraph respectively based on respective words and respective entities included in the paragraph; and determining a similarity between the query sequence and the paragraph according to the word vector representation of the query sequence, the entity vector representation of the query sequence, the word vector representation of the paragraph, and the entity vector representation of the paragraph.

15 Claims, 3 Drawing Sheets

(51) Int. Cl.
    *G06F 16/33*   (2019.01)
    *G06F 40/295*  (2020.01)

(56) References Cited

U.S. PATENT DOCUMENTS

| | | |
|---|---|---|
| 2010/0169375 A1 | 7/2010 | Cumby et al. |
| 2015/0169584 A1 | 6/2015 | Kwok et al. |
| 2016/0189047 A1* | 6/2016 | Meij .................... G06F 40/295 706/11 |
| 2018/0082197 A1* | 3/2018 | Aravamudan ......... G06N 5/022 |

FOREIGN PATENT DOCUMENTS

| | | |
|---|---|---|
| CN | 103218432 A | 7/2013 |
| CN | 106021223 A | 10/2016 |
| CN | 107102989 A | 8/2017 |

OTHER PUBLICATIONS

Chinese Patent Application No. 201810915123.6, Office Action dated Aug. 4, 2021, 8 pages.
Chinese Patent Application No. 201810915123.6, English translation of Office Action dated Aug. 4, 2021, 7 pages.

* cited by examiner

QUERY PROCESSING METHOD, APPARATUS, SERVER AND STORAGE MEDIUM

CROSS-REFERENCE TO RELATED APPLICATION

This application claims priority to Chinese Patent Application Serial No. 201810915123.6, filed with the State Intellectual Property Office of P. R. China on Aug. 13, 2018, the entire content of which is incorporated herein by reference.

FIELD

The present disclosure relates to the field of internet technology, and more particularly, to a query processing method and apparatus, a server and a storage medium.

BACKGROUND

With the development of internet technology, users are more and more inclined to obtain desired information through search engines or various question-answer systems. The core technology of the search engines and question-answer systems is sorting. By displaying relevant information ranked in the front of the search results to users first, users' retrieval needs can be satisfied.

SUMMARY

Embodiments of the present disclosure provide a query processing method. In one embodiment, the method includes: determining a word vector representation of a query sequence and an entity vector representation of the query sequence respectively based on respective words and respective entities included in the query sequence; determining a word vector representation of a paragraph and an entity vector representation of the paragraph respectively based on respective words and respective entities included in the paragraph; and determining a similarity between the query sequence and the paragraph based on the word vector representation of the query sequence, the entity vector representation of the query sequence, the word vector representation of the paragraph, and the entity vector representation of the paragraph.

Embodiments of the present disclosure provide a query processing apparatus. In one embodiment, the apparatus includes: a first vector representation module, configured to determine a word vector representation of a query sequence and an entity vector representation of the query sequence respectively based on respective words and respective entities included in the query sequence; a second vector representation module, configured to determine a word vector representation of a paragraph and an entity vector representation of the paragraph respectively based on respective words and respective entities included in the paragraph; and a similarity calculation module, configured to determine a similarity between the query sequence and the paragraph according to the word vector representation of the query sequence, the entity vector representation of the query sequence, the word vector representation of the paragraph, and the entity vector representation of the paragraph.

Embodiments of the present disclosure provide a server. In one embodiment, the server includes one or more processors and a memory. The memory is configured to store one or more programs. When the one or more programs are executed by the one or more processors, the one or more processors are caused to perform the query processing method according to any one of embodiments of the present disclosure.

Embodiments of the present disclosure provide a computer readable storage medium. In one embodiment, the storage medium has computer programs stored thereon that, when executed by a processor, perform the query processing method according to any one of embodiments of the present disclosure.

DETAILED DESCRIPTION

Figure 1:
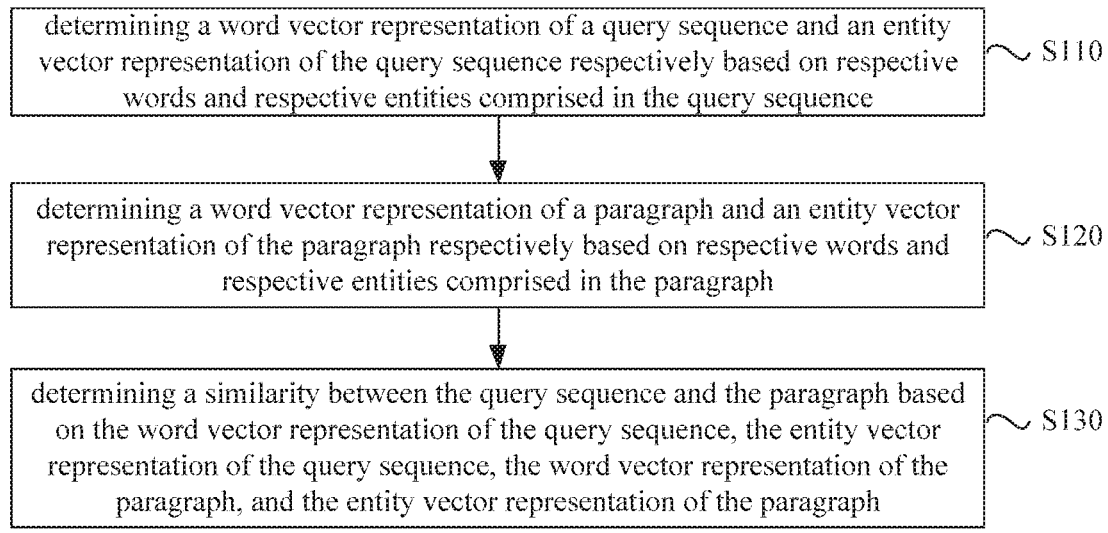
FIG. 1 is a flow chart of a query processing method according to a first embodiment of the present disclosure.

The present disclosure will be further described in detail below with reference accompanying drawings and embodiments. It should be understood that, specific embodiments described herein serve to explain the present disclosure, and are not construed to limit the scope of the present disclosure. In addition, it should be noted that, for the convenience of description, only some but not all of the structures related to the present disclosure are shown in the drawings.

In the related art, sorting is performed based on literal meaning, and further introducing technologies such as synonyms, click co-occurrence and the like. However, these methods do not really understand semantic meanings, nor do these methods have good generalization ability. At present, with the development of machine learning and deep learning, some feature-based or presentation-based models, such as LTR (Learning to Rank linear model), DSSM (Deep Structured Semantic Models), have achieved good results. However, models like these are essentially based on statistics, requiring huge amounts of training data, and computers don't really understand the semantic meanings. Moreover, the generalization ability and universality of retrieval sorting by these models are limited.

Thus, the present disclosure provides a query processing method and apparatus, a server and a storage medium.

First Embodiment

FIG. 1 is a flow chart of a query processing method according to a first embodiment of the present disclosure. The embodiment may be applied to a scenario that a user retrieves information through a search engine or a question-and-answer system. The method may be performed by a corresponding query processing apparatus, which may be implemented in software and/or hardware and may be configured on a server.

As illustrated in FIG. 1, the query processing method provided by embodiments of the present disclosure may include the following.

At block S110, a word vector representation of a query sequence and an entity vector representation of the query sequence are determined respectively based on respective words and respective entities included in the query sequence.

In the embodiment, the query sequence may be a single or a plurality of keywords, also may be a statement including a plurality of keywords, which is not limited in detail herein. Word segmentation may be performed on the query sequence by using a word segmentation technique to obtain the words included in the query sequence. For example, the query sequence may be segmented by using a word segmentation database, a stop word database or a deep learning technology. For the query sequence, the entities included in the query sequence may be determined based on a knowledge graph. The knowledge graph is a kind of knowledge database used to describe the relationship between entities in a real world. An entity can be a person name, a place name, an organization name, a concept and the like.

In the embodiment, the words and the entities in the query sequence are represented as low-dimensional real value vectors respectively for subsequently calculating a similarity between the query sequence and a paragraph quickly and accurately. For example, based on the knowledge graph data, a word vector and an entity vector may be trained in advance and the word vector and the entity vector are kept in one vector space with a same dimension. For the obtained words and entities in the query sequence, an embedding operation is performed on the words and entities in the query sequence based on the pre-trained word vector and entity vector, and the word vector representation of the query sequence and the entity vector representation of the query sequence are obtained. The word vector representation and the entity vector representation are distributed representations.

At block S120, a word vector representation of a paragraph and an entity vector representation of the paragraph are determined respectively based on respective words and respective entities included in the paragraph.

In the embodiment, the same approach as in the description at S110 may be used to perform word segmentation on the paragraph by using various word segmentation techniques to obtain the words included in the paragraph. The respective entities included in the paragraph are determined based on the knowledge graph.

Similarly, the words and entities in the paragraph are represented as low-dimensional real value vectors respectively for subsequently calculating the similarity between the query sequence and the paragraph quickly and accurately. For example, the embedding operation is performed on the words and entities included in the paragraph based on the pre-trained word vector and the entity vector, and the word vector representation of the paragraph and the entity vector representation of the paragraph are obtained respectively. The word vector representation and the entity vector representation are distributed representations.

At block S130, a similarity between the query sequence and the paragraph is determined based on the word vector representation of the query sequence, the entity vector representation of the query sequence, the word vector representation of the paragraph, and the entity vector representation of the paragraph.

In general, during an information retrieval, by calculating the similarity between the query sequence and the paragraph, it is determined whether the paragraph is the data information required by the user. In detail, the higher the similarity, the more likely it is that the paragraph is needed by the user, that is, the higher the accuracy of the retrieval. For example, for calculating the similarity between the query sequence and the paragraph, it can be determined by respectively calculating the similarities between the word vector representation and the entity vector representation of the query sequence and the word vector representation and the entity vector representation of the paragraph.

In the embodiment, the word vector representation and the entity vector representation of the query sequence, the word vector representation and the entity vector representation of the paragraph are determined based on the respective words and the respective entities included in the query sequence and the respective words and the respective entities included in the paragraph. The similarity between the query sequence and the paragraph is calculated based on the word vector representation of the query sequence, the entity vector representation of the query sequence, the word vector representation of the paragraph, and the entity vector representation of the paragraph, such that the plurality of paragraphs may be sorted subsequently based on the similarity. Thus, the query processing method has better generalization ability and versatility by introducing the entity vector representation during calculating the similarity between the query sequence and the paragraph and further introducing the knowledge of the objective world.

Further, after the similarity between the query sequence and the paragraph is determined, the method further includes follows. A plurality of paragraphs is sorted based on the similarity between the query sequence and each of the plurality of paragraphs.

For example, the plurality of paragraphs is sorted from high to low according to the similarity between the query sequence and each of the plurality of paragraphs. The N top-ranked paragraphs are fed back to the user, such that the user can filter what he needs. Thus, the paragraphs with high similarities may be fed back to the user through sorting, so as to improve the accuracy of user retrieval and user experience.

Second Embodiment

Figure 2:
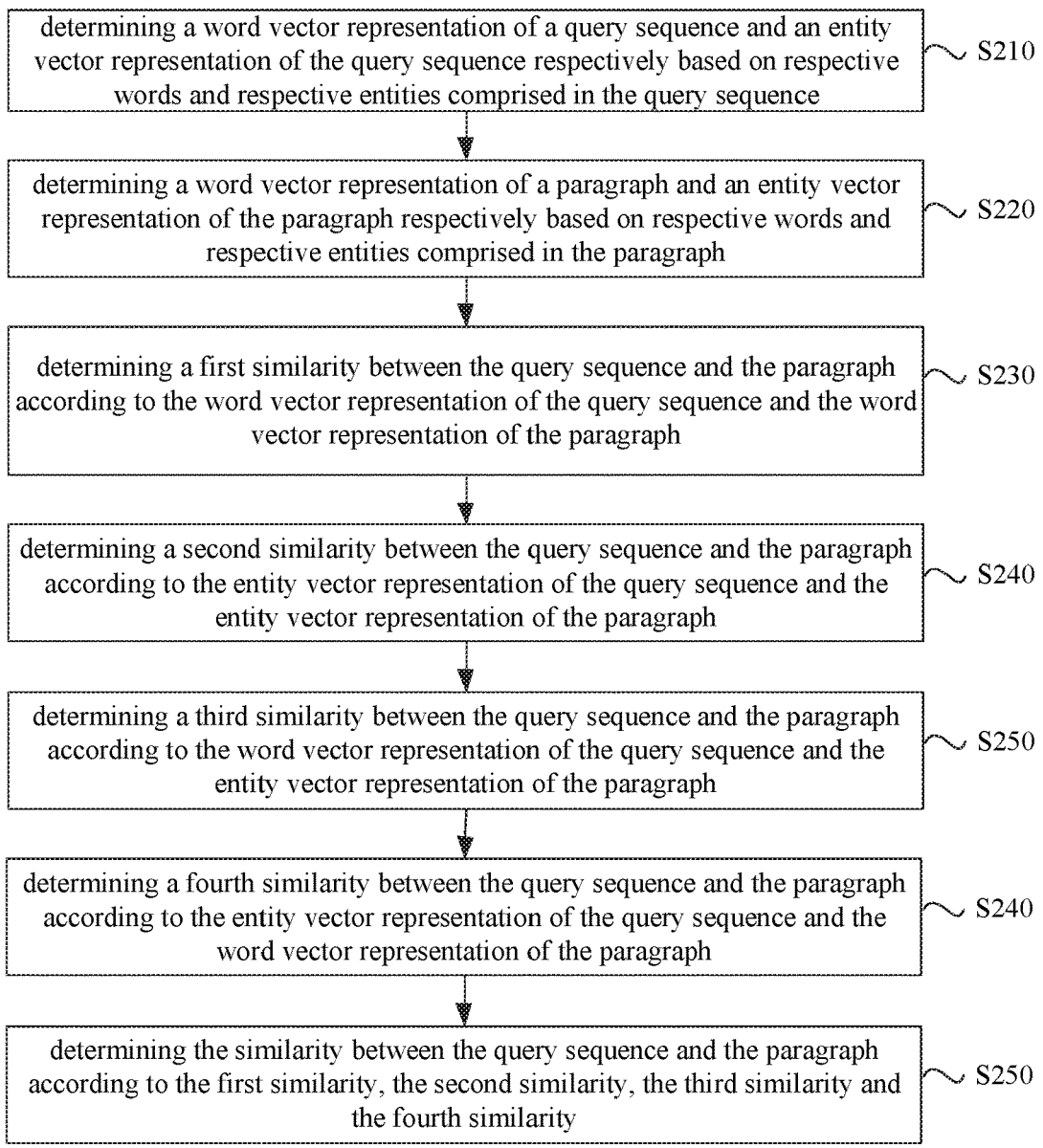
FIG. 2 is a flow chart of a query processing method according to a second embodiment of the present disclosure.

FIG. 2 is a flow chart of a query processing method according to a second embodiment of the present disclosure. The embodiment is optimized on the basis of the above embodiment, as illustrated in FIG. 2, the query processing method provided by embodiments of the present disclosure may include following actions.

At block S210, a word vector representation of a query sequence and an entity vector representation of the query sequence are determined respectively based on respective words and respective entities included in the query sequence.

At block S220, a word vector representation of a paragraph and an entity vector representation of the paragraph are determined respectively based on respective words and respective entities included in the paragraph.

At block S230, a first similarity between the query sequence and the paragraph is determined according to the word vector representation of the query sequence and the word vector representation of the paragraph.

In an embodiment, the first similarity between the query sequence and the paragraph is determined according to the word vector representation of the query sequence and the word vector representation of the paragraph by means of Euclidean distance, cosine distance, or the like. For example, when calculating the similarity through the Euclidean distance, the word vector representation of the query sequence and the word vector representation of the paragraph are regarded as two points in a coordinate system, and the similarity is determined by calculating a distance between the two points. For example, Euclidean distance is d, the similarity is s, $s=1/(1+d)$. The closer the distance, the greater the similarity is. When calculating the similarity through the cosine distance, the word vector representation of the query sequence and the word vector representation of the paragraph are regarded as two vectors in the coordinate system. An angle between the two vectors is calculated to determine the size of the similarity. The smaller the angle, the greater the similarity is.

At block S240, a second similarity between the query sequence and the paragraph is determined according to the entity vector representation of the query sequence and the entity vector representation of the paragraph.

For example, the means of Euclidean distance or cosine distance used in the action at block S230 may be used to calculate the similarity between the entity vector representation of the query sequence and the entity vector representation of the paragraph, so as to determine the second similarity between the query sequence and the paragraph.

At block S250, a third similarity between the query sequence and the paragraph is determined according to the word vector representation of the query sequence and the entity vector representation of the paragraph.

For example, the means of Euclidean distance or cosine distance used in the action at block S230 may be used to calculate the similarity between the word vector representation of the query sequence and the entity vector representation of the paragraph, so as to determine the third similarity between the query sequence and the paragraph.

At block S260, a fourth similarity between the query sequence and the paragraph is determined according to the entity vector representation of the query sequence and the word vector representation of the paragraph.

For example, the means of Euclidean distance or cosine distance used in the action at block S230 may be used to calculate the similarity between the entity vector representation of the query sequence and the word vector representation of the paragraph, so as to determine the fourth similarity between the query sequence and the paragraph.

At block S270, the similarity between the query sequence and the paragraph is determined according to the first similarity, the second similarity, the third similarity and the fourth similarity.

Weighting (such as averaging) processing is performed on the first similarity, the second similarity, the third similarity and the fourth similarity, and the similarity between the query sequence and the paragraph is determined according to a weighting result.

It should be noted that, in the embodiment, the similarity between the query sequence and the paragraph may be determined according to the first similarity and the second similarity. The accuracy of the similarity between the query sequence and the paragraph is improved by introducing a new consideration factor, i.e., the similarity between the entity vector representations.

In the embodiment, the first similarity between the query sequence and the paragraph is determined according to the word vector representation of the query sequence and the word vector representation of the paragraph, the second similarity between the query sequence and the paragraph is determined according to the entity vector representation of the query sequence and the entity vector representation of the paragraph, and the similarity between the query sequence and the paragraph is determined according to the first similarity and the second similarity. Thus, the query processing method has better generalization ability and versatility by introducing the entity vector representation during determining the similarity between the query sequence and the paragraph and further introducing the knowledge of the objective world.

Third Embodiment

Figure 3:
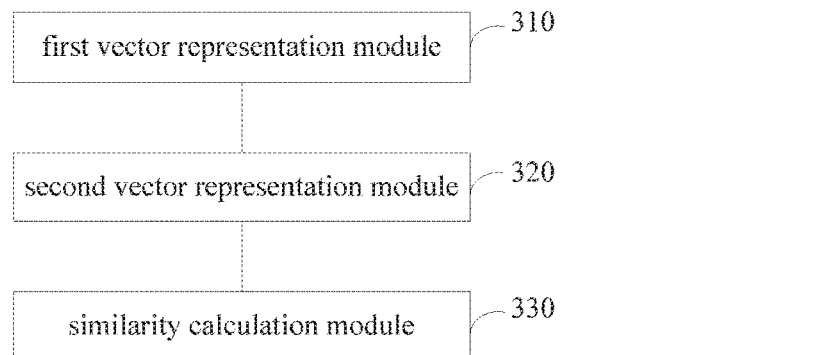
FIG. 3 is a block diagram of a query processing apparatus according to a third embodiment of the present disclosure.

FIG. 3 is a block diagram of a query processing apparatus according to a third embodiment of the present disclosure. As illustrated in FIG. 3, the apparatus includes: a first vector representation module 310, a second vector representation module 320 and a similarity calculation module 330.

The first vector representation module 310 is configured to determine a word vector representation of a query sequence and an entity vector representation of the query sequence respectively based on respective words and respective entities included in the query sequence.

The second vector representation module 320 is configured to determine a word vector representation of a paragraph and an entity vector representation of the paragraph respectively based on respective words and respective entities included in the paragraph.

The similarity calculation module 330 is configured to determine a similarity between the query sequence and the paragraph according to the word vector representation of the query sequence, the entity vector representation of the query sequence, the word vector representation of the paragraph, and the entity vector representation of the paragraph.

In the embodiment, the first vector representation module and the second vector representation module respectively determine the word vector representation and the entity vector representation of the query sequence, and the word vector representation and the entity vector representation of the paragraph according to the respective words and the respective entities of the query sequence and the respective words and the respective entities of the paragraph. On the basis of this, the similarity calculation module calculates the similarity between the query sequence and the paragraph, so as to sort the plurality of paragraphs according to the similarity. Thus, the generalization ability and versatility of the query processing apparatus may be improved by introducing the entity vector representation.

On the basis of the above embodiments, the similarity calculation module is further configured to: determine a first similarity between the query sequence and the paragraph according to the word vector representation of the query sequence and the word vector representation of the paragraph; determine a second similarity between the query sequence and the paragraph according to the entity vector representation of the query sequence and the entity vector representation of the paragraph; and determine the similarity between the query sequence and the paragraph according to the first similarity and the second similarity.

On the basis of the above embodiments, the similarity calculation module is further configured to: determine a third similarity between the query sequence and the paragraph according to the word vector representation of the query sequence and the entity vector representation of the paragraph; determine a fourth similarity between the query sequence and the paragraph according to the entity vector representation of the query sequence and the word vector representation of the paragraph; and determine the similarity between the query sequence and the paragraph according to the first similarity, the second similarity, the third similarity and the fourth similarity.

On the basis of the above embodiments, the similarity calculation module is further configured to: perform weighting processing on the first similarity, the second similarity, the third similarity and the fourth similarity, and determine the similarity between the query sequence and the paragraph according to a weighting result.

On the basis of the above embodiments, the apparatus further includes an entity identification module.

The entity identification module is configured to determine the respective entities included in the query sequence based on a knowledge graph, and determine the respective entities included in the paragraph based on the knowledge graph.

On the basis of the above embodiments, the apparatus further includes a sorting module.

The sorting module is configured to sort a plurality of paragraphs based on the similarity between the query sequence and each of the plurality of paragraphs.

The query processing apparatus provided by embodiments of the present disclosure may execute the query processing method according to any one of embodiments of the present disclosure, and has the functional modules and beneficial effects corresponding to the method.

Fourth Embodiment

Figure 4:
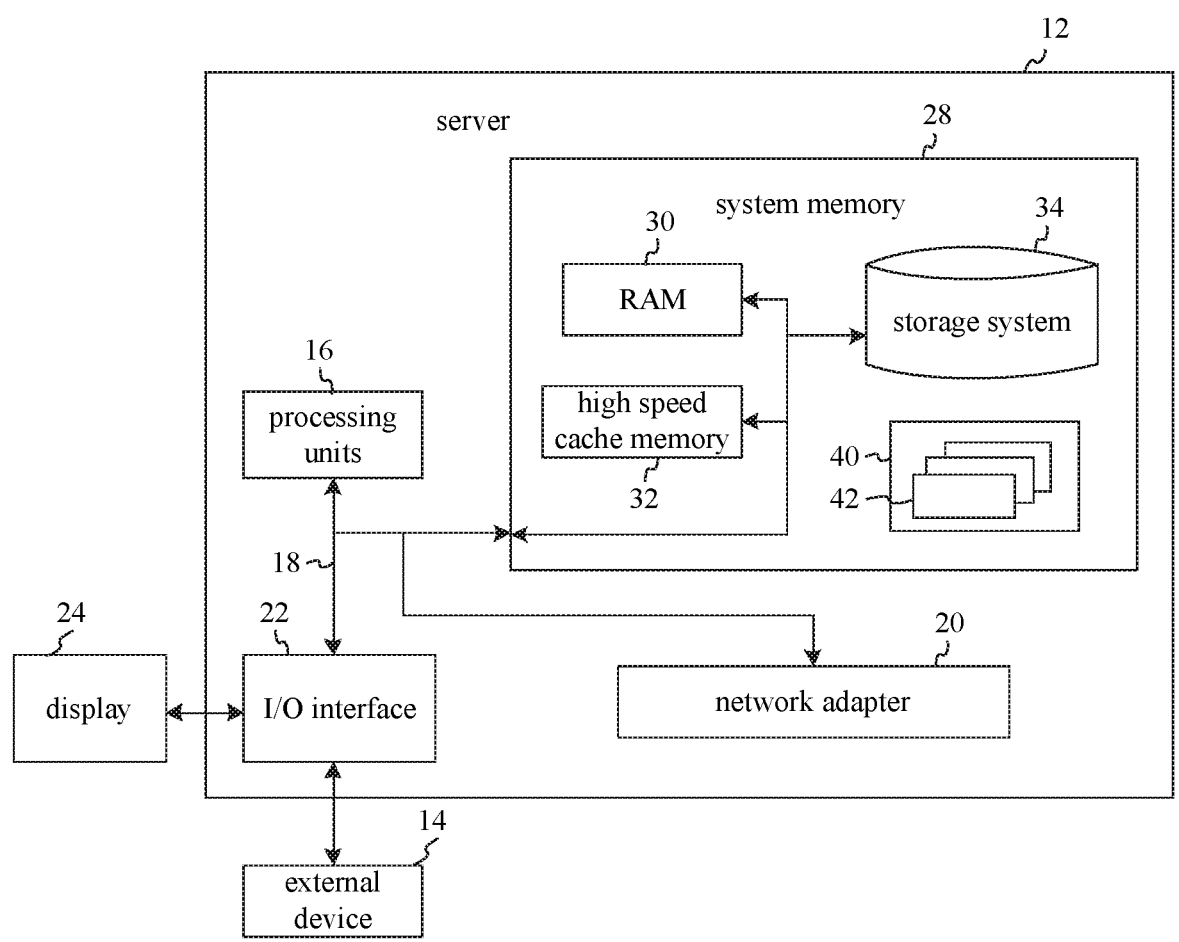
FIG. 4 is a block diagram of a server according to a fourth embodiment of the present disclosure.

FIG. 4 is a block diagram of a server according to a fourth embodiment of the present disclosure. FIG. 4 is a block diagram of an exemplary server 12 suitable for realizing implementations of the present disclosure. The server 12 illustrated in FIG. 4 is merely an example, and should not be understood as any restriction on the function and the usage range of embodiments of the present disclosure.

As illustrated in FIG. 4, the server 12 may be represented via a general computer device form. Components of the server 12 may include but be not limited to one or more processors or processing units 16, a system memory 28, and a bus 18 connecting various system components including the system memory 28 and the processing units 16.

The bus 18 represents one or more of several types of bus architectures, including a memory bus or a memory controller, a peripheral bus, a graphic acceleration port bus, a processor, or a local bus using any of a variety of bus architectures. For example, these architectures include, but are not limited to, an industry standard architecture (ISA) bus, a micro-channel architecture (MCA) bus, an enhanced ISA bus, a video electronic standards association (VESA) local bus, and a peripheral component interconnect (PCI) bus.

Typically, the server 12 may typically include multiple kinds of computer-readable media. These media may be any storage media accessible by the server 12, including transitory or non-transitory storage medium and movable or unmovable storage medium.

The memory 28 may include a computer-readable medium in a form of volatile memory, such as a random access memory (RAM) 30 and/or a high-speed cache memory 32. The server 12 may further include other transitory/non-transitory storage media and movable/unmovable storage media. By way of example only, the storage system 34 may be configured to read and write non-removable, non-volatile magnetic media (not shown in FIG. 4, commonly referred to as "hard drive"). Although not illustrated in FIG. 4, a magnetic disk driver for reading from and writing to a removable and non-volatile magnetic disk (e.g. "floppy disk"), and an optical driver for reading from and writing to a removable and non-volatile optical disk (e.g. a compact disc read only memory (CD-ROM, a digital video disc read only Memory (DVD-ROM), or other optical media) may be provided. In these cases, each driver may be connected to the bus 18 via one or more data medium interfaces. The memory 28 may include at least one program product, which has a set (for example at least one) of program modules configured to perform the functions of embodiments of the present disclosure.

A program/application 40 with a set (at least one) of program modules 42 may be stored in, for example, memory 28. The program modules 42 may include, but not limit to, an operating system, one or more application programs, other program modules and program data. Each of these examples or some combinations thereof may include an implementation of a network environment. The program modules 42 are generally configured to implement functions and/or methods described in embodiments of the present disclosure.

The server 12 may also communicate with one or more external devices 14 (e.g., a keyboard, a pointing device, a display 24, and etc.) and may also communicate with one or more devices that enables a user to interact with the server 12, and/or other device (e.g., a network card, a modem, and etc.) that enables the server 12 to communicate with one or more other computing devices. This kind of communication can be achieved by the input/output (I/O) interface 22. In addition, the server 12 may communicate with one or more networks (such as a local area network (LAN), a wide area network (WAN) and/or a public network such as the Internet) through a network adapter 20. As illustrated in FIG. 4, the network adapter 20 communicates with other modules of the server 12 over the bus 18. It should be understood that although not shown in FIG. 4, other hardware and/or software modules may be used in combination with the server 12. The hardware and/or software includes, but not limited to, microcode, device drivers, redundant processing units, external disk drive arrays, RAID systems, tape drives, data backup storage systems and the like.

The processing unit 16 is configured to perform various functional applications and data processing by running programs stored in the system memory 28, for example, to perform the query processing method provided by embodiments of the present disclosure. The method includes: determining a word vector representation of a query sequence and an entity vector representation of the query sequence respectively based on respective words and respective entities included in the query sequence; determining a word vector representation of a paragraph and an entity vector representation of the paragraph respectively based on respective words and respective entities included in the paragraph; and determining a similarity between the query sequence and the paragraph based on the word vector representation of the query sequence, the entity vector representation of the query sequence, the word vector representation of the paragraph, and the entity vector representation of the paragraph.

Fifth Embodiment

Embodiments of the present disclosure further provide a storage medium including computer executable instructions. When the computer executable instructions are executed by a computer processor, the query processing method is executed. The method includes: determining a word vector representation of a query sequence and an entity vector representation of the query sequence respectively based on respective words and respective entities included in the query sequence; determining a word vector representation of a paragraph and an entity vector representation of the paragraph respectively based on respective words and respective entities included in the paragraph; and determining a similarity between the query sequence and the paragraph based on the word vector representation of the query sequence, the entity vector representation of the query sequence, the word vector representation of the paragraph, and the entity vector representation of the paragraph. Certainly, for the storage medium including computer executable instructions provided in embodiments of the present disclosure, the computer executable instructions are not limited to the operations of the method described above, but may also included the related operations provided by any one of embodiments of the present disclosure.

The storage medium of embodiments of the present disclosure may adopt any combination of one or more computer readable media. The computer readable medium may be a computer readable signal medium or a computer readable storage medium. The computer readable storage medium may be, but is not limited to, for example, an electrical, magnetic, optical, electromagnetic, infrared, or semiconductor system, apparatus, device, component or any combination thereof. A specific example of the computer readable storage media include (a non-exhaustive list): an electrical connection having one or more wires, a portable computer disk, a hard disk, a random access memory (RAM), a read only memory (ROM), an Erasable Programmable Read Only Memory (EPROM) or a flash memory, an optical fiber, a compact disc read-only memory (CD-ROM), an optical memory component, a magnetic memory component, or any suitable combination thereof. In context, the computer readable storage medium may be any tangible medium including or storing programs. The programs may be used by an instruction executed system, apparatus or device, or a connection thereof.

The computer readable signal medium may include a data signal propagating in baseband or as part of carrier which carries a computer readable program codes. Such propagated data signal may be in many forms, including but not limited to an electromagnetic signal, an optical signal, or any suitable combination thereof. The computer readable signal medium may also be any computer readable medium other than the computer readable storage medium, which may send, propagate, or transport programs used by an instruction executed system, apparatus or device, or a connection thereof.

The program code stored on the computer readable medium may be transmitted using any appropriate medium, including but not limited to wireless, wireline, optical fiber cable, RF, or any suitable combination thereof.

The computer program code for carrying out operations of embodiments of the present disclosure may be written in one or more programming languages. The programming language includes an object oriented programming language, such as Java, Smalltalk, C++, as well as conventional procedural programming language, such as "C" language or similar programming language. The program code may be executed entirely on a user's computer, partly on the user's computer, as a separate software package, partly on the user's computer, partly on a remote computer, or entirely on the remote computer or server. In a case of the remote computer, the remote computer may be connected to the user's computer or an external computer (such as using an Internet service provider to connect over the Internet) through any kind of network, including a Local Area Network (hereafter referred as to LAN) or a Wide Area Network (hereafter referred as to WAN).

It should be noted that, the above are only preferred embodiments and applied technical principles of the present disclosure. Those skilled in the art should understand that, the present disclosure is not limited to the specific embodiments described herein, and various obvious changes, readjustments and substitutions that are made by those skilled in the art will not depart from the scope of the present disclosure. Therefore, although the present disclosure has been described in detail by the above embodiments, the present disclosure is not limited to the above embodiments, and more other equivalent embodiments may be included without departing from the concept of the present disclosure, and the scope of the present disclosure is determined by the scope of the appended claims.

What is claimed is:

1. A query processing method, comprising:
    determining a word vector representation of a query sequence and an entity vector representation of the query sequence respectively based on respective words and respective entities comprised in the query sequence;
    determining a word vector representation of a paragraph and an entity vector representation of the paragraph respectively based on respective words and respective entities comprised in the paragraph; and
    determining a similarity between the query sequence and the paragraph based on the word vector representation of the query sequence, the entity vector representation of the query sequence, the word vector representation of the paragraph, and the entity vector representation of the paragraph;
    wherein determining the similarity between the query sequence and the paragraph based on the word vector representation of the query sequence, the entity vector representation of the query sequence, the word vector representation of the paragraph, and the entity vector representation of the paragraph comprises:
    determining a first similarity between the query sequence and the paragraph according to the word vector representation of the query sequence and the word vector representation of the paragraph;
    determining a second similarity between the query sequence and the paragraph according to the entity vector representation of the query sequence and the entity vector representation of the paragraph; and
    determining the similarity between the query sequence and the paragraph according to the first similarity and the second similarity.

2. The method of claim 1, wherein determining the similarity between the query sequence and the paragraph according to the first similarity and the second similarity between the query sequence and the paragraph comprises:
    determining a third similarity between the query sequence and the paragraph according to the word vector representation of the query sequence and the entity vector representation of the paragraph;
    determining a fourth similarity between the query sequence and the paragraph according to the entity vector representation of the query sequence and the word vector representation of the paragraph; and
    determining the similarity between the query sequence and the paragraph according to the first similarity, the second similarity, the third similarity and the fourth similarity.

3. The method of claim 2, wherein determining the similarity between the query sequence and the paragraph according to the first similarity, the second similarity, the third similarity and the fourth similarity comprises:
    performing weighting processing on the first similarity, the second similarity, the third similarity and the fourth similarity, and determining the similarity between the query sequence and the paragraph according to a weighting result.

4. The method of claim 1, before determining the similarity between the query sequence and the paragraph according to the word vector representation of the query sequence, the entity vector representation of the query sequence, the word vector representation of the paragraph and the entity vector representation of the paragraph, further comprising:
determining the respective entities comprised in the query sequence based on a knowledge graph, and determining the respective entities comprised in the paragraph based on the knowledge graph.

5. The method of claim 1, wherein the paragraph comprises a plurality of paragraphs, after determining the similarity between the query sequence and the paragraph, the method further comprises:
sorting the plurality of paragraphs based on the similarity between the query sequence and each of the plurality of paragraphs.

6. A server, comprising:
one or more processors; and
a memory, configured to store one or more programs,
wherein, when the one or more programs are executed by the one or more processors, the one or more processors are caused to perform a query processing method, the method comprising:
determining a word vector representation of a query sequence and an entity vector representation of the query sequence respectively based on respective words and respective entities comprised in the query sequence;
determining a word vector representation of a paragraph and an entity vector representation of the paragraph respectively based on respective words and respective entities comprised in the paragraph; and
determining a similarity between the query sequence and the paragraph based on the word vector representation of the query sequence, the entity vector representation of the query sequence, the word vector representation of the paragraph, and the entity vector representation of the paragraph;
wherein determining the similarity between the query sequence and the paragraph based on the word vector representation of the query sequence, the entity vector representation of the query sequence, the word vector representation of the paragraph, and the entity vector representation of the paragraph comprises:
determining a first similarity between the query sequence and the paragraph according to the word vector representation of the query sequence and the word vector representation of the paragraph;
determining a second similarity between the query sequence and the paragraph according to the entity vector representation of the query sequence and the entity vector representation of the paragraph; and
determining the similarity between the query sequence and the paragraph according to the first similarity and the second similarity.

7. The server of claim 6, wherein determining the similarity between the query sequence and the paragraph according to the first similarity and the second similarity between the query sequence and the paragraph comprises:
determining a third similarity between the query sequence and the paragraph according to the word vector representation of the query sequence and the entity vector representation of the paragraph;
determining a fourth similarity between the query sequence and the paragraph according to the entity vector representation of the query sequence and the word vector representation of the paragraph; and
determining the similarity between the query sequence and the paragraph according to the first similarity, the second similarity, the third similarity and the fourth similarity.

8. The server of claim 7, wherein determining the similarity between the query sequence and the paragraph according to the first similarity, the second similarity, the third similarity and the fourth similarity comprises:
performing weighting processing on the first similarity, the second similarity, the third similarity and the fourth similarity, and determining the similarity between the query sequence and the paragraph according to a weighting result.

9. The server of claim 6, before determining the similarity between the query sequence and the paragraph according to the word vector representation of the query sequence, the entity vector representation of the query sequence, the word vector representation of the paragraph and the entity vector representation of the paragraph, further comprising:
determining the respective entities comprised in the query sequence based on a knowledge graph, and determining the respective entities comprised in the paragraph based on the knowledge graph.

10. The server of claim 6, wherein the paragraph comprises a plurality of paragraphs, after determining the similarity between the query sequence and the paragraph, the method further comprises:
sorting the plurality of paragraphs based on the similarity between the query sequence and each of the plurality of paragraphs.

11. A non-transitory computer readable storage medium, storing thereon with computer programs, wherein when executed by a processor, a query processing method is performed, the method comprising:
determining a word vector representation of a query sequence and an entity vector representation of the query sequence respectively based on respective words and respective entities comprised in the query sequence;
determining a word vector representation of a paragraph and an entity vector representation of the paragraph respectively based on respective words and respective entities comprised in the paragraph; and
determining a similarity between the query sequence and the paragraph based on the word vector representation of the query sequence, the entity vector representation of the query sequence, the word vector representation of the paragraph, and the entity vector representation of the paragraph;
wherein determining the similarity between the query sequence and the paragraph based on the word vector representation of the query sequence, the entity vector representation of the query sequence, the word vector representation of the paragraph, and the entity vector representation of the paragraph comprises:
determining a first similarity between the query sequence and the paragraph according to the word vector representation of the query sequence and the word vector representation of the paragraph;
determining a second similarity between the query sequence and the paragraph according to the entity vector representation of the query sequence and the entity vector representation of the paragraph; and determining the similarity between the query sequence and the paragraph according to the first similarity and the second similarity.

12. The non-transitory computer readable storage medium of claim 11, wherein determining the similarity between the query sequence and the paragraph according to the first similarity and the second similarity between the query sequence and the paragraph comprises:

determining a third similarity between the query sequence and the paragraph according to the word vector representation of the query sequence and the entity vector representation of the paragraph;

determining a fourth similarity between the query sequence and the paragraph according to the entity vector representation of the query sequence and the word vector representation of the paragraph; and determining the similarity between the query sequence and the paragraph according to the first similarity, the second similarity, the third similarity and the fourth similarity.

13. The non-transitory computer readable storage medium of claim 12, wherein determining the similarity between the query sequence and the paragraph according to the first similarity, the second similarity, the third similarity and the fourth similarity comprises:

performing weighting processing on the first similarity, the second similarity, the third similarity and the fourth similarity, and determining the similarity between the query sequence and the paragraph according to a weighting result.

14. The non-transitory computer readable storage medium of claim 11, before determining the similarity between the query sequence and the paragraph according to the word vector representation of the query sequence, the entity vector representation of the query sequence, the word vector representation of the paragraph and the entity vector representation of the paragraph, further comprising:

determining the respective entities comprised in the query sequence based on a knowledge graph, and determining the respective entities comprised in the paragraph based on the knowledge graph.

15. The non-transitory computer readable storage medium of claim 11, wherein the paragraph comprises a plurality of paragraphs, after determining the similarity between the query sequence and the paragraph, the method further comprises:

sorting the plurality of paragraphs based on the similarity between the query sequence and each of the plurality of paragraphs.

* * * * *